United States Patent
Komatsu et al.

(10) Patent No.: US 6,552,870 B2
(45) Date of Patent: Apr. 22, 2003

(54) DISK DRIVE IMPROVED IN MOUNTING STRUCTURE OF A PRINTED CIRCUIT BOARD WITH RESPECT TO A MOTOR FRAME

(75) Inventors: Hisateru Komatsu, Tendo (JP); Mamoru Takahashi, Murayama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/772,661

(22) Filed: Jan. 30, 2001

(65) Prior Publication Data

US 2001/0010608 A1 Aug. 2, 2001

(30) Foreign Application Priority Data

Feb. 2, 2000  (JP) ........................................ 2000-025345

(51) Int. Cl.$^7$ ............................ G11B 5/012; H05K 1/14
(52) U.S. Cl. ..................................... 360/97.01; 361/749
(58) Field of Search ........................ 360/97.01; 439/67, 439/77; 369/75.2; 361/748–749

(56) References Cited

U.S. PATENT DOCUMENTS 5,499,161 A * 3/1996 Hosseinzadeh et al. .. 360/98.01

* cited by examiner

Primary Examiner—George J. Letscher
(74) Attorney, Agent, or Firm—Frishauf, Holtz, Goodman & Chick, P.C.

(57) ABSTRACT

In a disk drive using a motor frame, the motor frame is provided with a projection preliminarily formed to protrude on its principal surface. The projection has a slit formed at its base. A printed circuit board is inserted into the slit to be engaged with the projection. The motor frame is provided with a positioning boss fitted into a positioning hole formed in the printed circuit board. The motor frame is further provided with a plurality of board holding portions bent upward on the principal surface to be engaged with end portions of the printed circuit board. Preferably, the positioning boss is formed by coining.

5 Claims, 5 Drawing Sheets

DISK DRIVE IMPROVED IN MOUNTING STRUCTURE OF A PRINTED CIRCUIT BOARD WITH RESPECT TO A MOTOR FRAME

BACKGROUND OF THE INVENTION

This invention relates to a disk drive for driving a floppy disk or a flexible disk to carry out data recording/reproducing operations.

A disk drive of the type is widely used and mounted in a portable electronic equipment such as a laptop personal computer, a notebook computer, or a notebook word processor. The disk drive comprises a magnetic head for reading/writing data from/to a flexible disk, a carriage assembly supporting the magnetic head, a stepping motor for moving the carriage assembly with respect to the flexible disk, and a drive motor called a spindle motor or a direct drive motor for rotating the flexible disk.

The drive motor is mounted to a main frame of the disk drive by the use of a motor frame. The motor frame has a principal surface, i.e., an upper surface on which a printed circuit board may can be mounted and fixed.

In a structure of fixing the printed circuit board to the motor frame, it is required to prevent the printed circuit board from floating up from the motor frame and to improve the parallelism of the printed circuit board. Furthermore, it is required to improve the accuracy in mounting the printed circuit board to the motor frame.

SUMMARY OF THE INVENTION

It is therefore an object of this invention to provide a disk drive in which a printed circuit board is fixed to a motor frame with a high accuracy and a high parallelism.

It is another object of this invention to provide a disk drive in which a printed circuit board is mounted to a motor frame in an improved contact condition without requiring additional post-working steps.

Other objects of the present invention will become clear as the description proceeds.

According to this invention, there is provided a disk drive comprising a motor frame having a principal surface and a printed circuit board placed on the principal surface and having a positioning hole, the motor frame having a projection protruding from said principal surface and having a slit on its side surface, a plurality of board holding portions protruding from the principal surface and engaged with end portions of the printed circuit board, and a positioning boss protruding from the principle surface to be fitted into the positioning hole, the printed circuit board being inserted into the slit to be engaged with the projection.

DESCRIPTION OF PREFERRED EMBODIMENT

Figure 1:
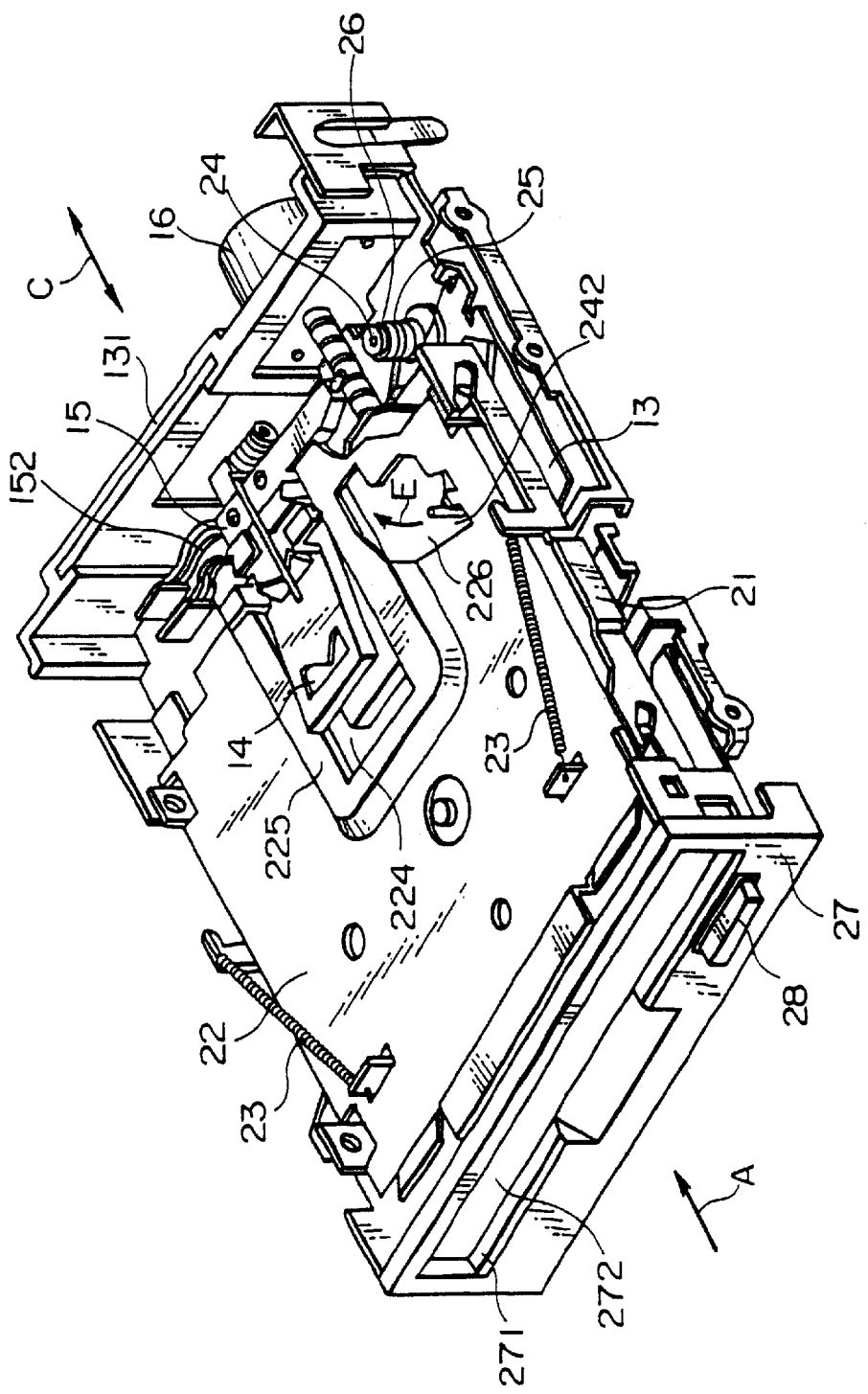
FIG. 1 is a perspective view of a conventional disk drive.
Figure 2:
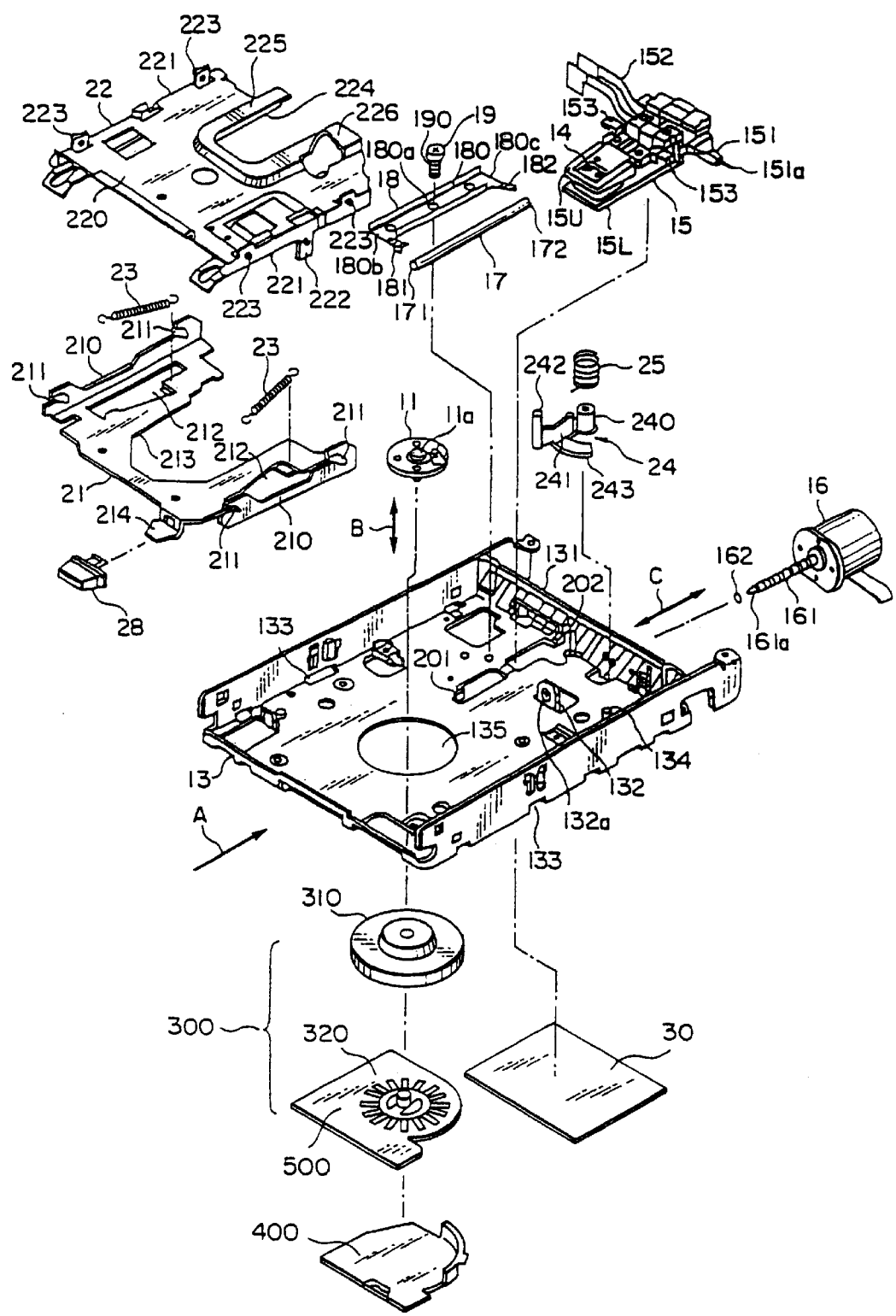
FIG. 2 is an exploded perspective view of the disk drive illustrated in FIG. 1 with a front panel and a case omitted therefrom.

For facilitating a better understanding of the present invention, a conventional disk drive will at first be described with reference to FIGS. 1 and 2.

The disk drive illustrated in the figure is an apparatus for driving a 3.5-inch floppy disk which is well known in the art. The floppy disk is inserted into the disk drive in an inserting direction depicted by an arrow A in FIGS. 1 and 2. The floppy disk thus inserted is held on a disk table 11 having a rotation shaft 11a in the state where the rotation shaft 11a of the disk table 11 is coincident with a center axis of the floppy disk. As will later be described, the disk table 11 is rotatably supported on a principal or upper surface of a main frame 13. The rotation shaft 11a of the disk table 11 has an axial direction B parallel to a thickness direction of the main frame 13. Driven by a spindle motor 300 mounted on a lower surface of the main frame 13, the disk table 11 is rotated so that a magnetic recording medium contained in the floppy disk is rotated. On the back surface of the main frame 13, a main printed board 30 with a number of electronic parts mounted thereon is attached.

The disk drive comprises a pair of upper and lower magnetic heads 14 (only the upper one being illustrated in the figure) for reading/writing data from/to the magnetic recording medium in the floppy disk. The magnetic heads 14 are supported by a carriage assembly 15 arranged on a rear side of the disk drive. Specifically, the carriage assembly 15 comprises an upper carriage 15U supporting the upper magnetic head 14 and a lower carriage 15L supporting the lower magnetic head 14. As will later be described, the carriage assembly 15 is disposed on the principal surface of the main frame 13 with a space kept from the main frame 13. The carriage assembly 15 supports the magnetic heads 14 at its tip so that the magnetic heads 14 are movable with respect to the floppy disk in a predetermined radial direction depicted by an arrow C in FIGS. 1 and 2.

The main frame 13 has a rear side wall 131 provided with a stepping motor 16 fixed thereto. The stepping motor 16 serves to linearly drive the carriage assembly 15 in the predetermined radial direction C. Specifically, the stepping motor 16 has a driving shaft or rotation shaft 161 extending in parallel to the predetermined radial direction C. The rotation shaft 161 is threaded to form a male screw. The rotation shaft 161 has a tip 161a. On the other hand, the main frame 13 has a bent portion 132 formed by a cut-and-bend process to stand up on its principal surface. The bent portion 132 is provided with a hole 132a. The tip 161a of the rotation shaft 161 penetrates the hole 132a of the bent portion 132. The tip 161a of the rotation shaft 161 is provided with a steel ball 162. By the hole 132a and the steel ball 162, the rotation shaft 161 is defined in position to extend in parallel to the predetermined radial direction C and the tip 161a of the rotation shaft 161 is rotatably held.

On the other hand, the carriage assembly 15 comprises an arm 151 extending from the lower carriage 15L to the rotation shaft 161. The arm 151 has an arm end 151a engaged with a root of the male screw of the rotation shaft 161. Therefore, when the rotation shaft 161 of the stepping motor 16 is rotated, the arm end 151a of the arm 151 is moved along the root of the male screw of the rotation shaft 161 so that the carriage assembly 15 itself is moved in the predetermined radial direction C. At any rate, the stepping motor 16 serves as driving means for linearly moving the carriage assembly 15 in the predetermined radial direction C.

The rotation shaft 161 of the stepping motor 16 is disposed on one side of the carriage assembly 15. Therefore, the one side of the carriage assembly 15 is movably supported by the rotation shaft 161 with a space kept from the frame 13. However, only by the rotation shaft 161 supporting the one side, the whole of the carriage assembly 15 can not be kept spaced from the principal surface of the main frame 13. Therefore, the other side of the carriage assembly 15 is supported by a guide bar 17 for guiding the movement of the carriage assembly 15. Thus, the rotation shaft 161 of the stepping motor 16 and the guide bar 17 are arranged on the one side and on the other side of the carriage assembly 15. The guide bar 17 extends in parallel to the predetermined radial direction C and has one end 171 and the other end 172 fixed on the principal surface of the main frame 13 as will later be described. The guide bar 17 serves to guide the carriage assembly 15 in the predetermined radial direction C. With this structure, the whole of the carriage assembly 15 is kept spaced from the principal surface of the main frame 13.

In addition, a plurality of flexible printed circuits (FPC) 152 extend from the carriage assembly 15 on the side of the guide bar 17. The FPCs 152 are electrically connected to the main printed board 30 attached to the back surface of the main frame 13.

The guide bar 17 is clamped on the principal surface of the main frame 13 by a guide bar clamp 18. The guide bar clamp 18 is fixed at its center to the principal surface of the main frame 13 by the use of a binding screw 19. Specifically, the guide bar clamp 18 comprises a rectangular fixing member 180 slightly longer in length than the guide bar 17. The rectangular fixing member 180 is provided with a hole 180a formed approximately at its center to have a size allowing the insertion of a screw shaft 190 of the binding screw 19. The rectangular fixing member 180 has one end 180b and the other end 180c provided with a pair of arms 181 and 182 extending therefrom to clamp the one end 171 and the other end 172 of the guide bar 17, respectively.

Since the guide bar clamp 18 merely clamps the guide bar 17, the guide bar 17 can not be fixed to the principal surface of the main frame 13 by the guide bar clamp 18 alone. Therefore, a pair of positioning members for defining positions of the one end 171 and the other end 172 of the guide bar 17 are required. Herein, the positioning members are implemented by a pair of bent portions 201 and 202 each of which is formed by cutting and bending a part of the main frame 13 to stand up from the principal surface of the main frame 13.

The lower carriage 15L of the carriage assembly 15 also serves as a supporting frame supporting the carriage assembly 15 so that the carriage assembly 15 is slidable along the guide bar 17. The lower carriage 15L has a projecting portion (not shown) projecting towards the guide bar 17. The guide bar 17 is slidably fitted in the projecting portion.

The disk drive further comprises an eject plate 21 and a disk holder 22. Each of the main frame 13, the eject plate 21, and the disk holder 22 is formed by punching, pressing, and bending a metal plate.

The eject plate 21 is mounted on the main frame 13 to be slidable in the inserting direction A of the floppy disk and an ejecting direction opposite thereto. In the manner which will later be described, the eject plate 21 holds the floppy disk in cooperation with the disk holder 22 when the disk drive is operated. In order to allow the floppy disk to be inserted into the disk drive in the inserting direction A and to be ejected from the disk drive in the ejecting direction, the eject plate 21 holds the floppy disk so that the floppy disk is slidable in the inserting direction A and the ejecting direction. The eject plate 21 comprises a pair of side walls 210 faced to each other. Each of the side walls 210 has a pair of cam portions 211. In addition, the eject plate 21 has a bottom wall provided with a pair of cut portions 212 formed along the both side walls 210, respectively, and a generally U-shaped opening portion 213 formed at a center portion thereof to surround the disk table 11. Furthermore, the eject plate 21 has a lower surface provided with a pin (which will later be described). The pin is adapted to be engaged with a locking part of an eject lever which will later be described.

The disk holder 22 is disposed on the eject plate 21. The disk holder 22 has a principal surface 220 and a pair of side walls 221 formed at both lateral ends of the principal surface 220 to face each other. The both side walls 221 are provided with projections 222 (only one being illustrated), respectively. The projections 222 are inserted into a pair of holes 133 formed in the main frame 13 through the cut portions 212 of the eject plate 21, respectively. By inserting the projections 222 into the holes 133 of the main frame 13, the disk holder 22 is positioned with respect to the main frame 13 in the inserting direction A. Simultaneously, the disk holder 22 is allowed to perform reciprocating movement in the axial direction B of the rotation shaft 11a of the disk table 11. Each of the both side walls 221 has a pair of pins 223. The pins 223 are inserted in the cam portions 211 formed on each of the side walls 210 of the eject plate 21, respectively. Between the disk holder 22 and the eject plate 21, a pair of eject springs 23 are bridged.

In the example being illustrated, the projections 222 are formed on the disk holder 22 while the holes 133 are formed in the main frame 13. Alternatively, projections may be formed on the main frame 13 while holes may be formed in the disk holder 22.

The disk holder 22 has a generally rectangular opening 224 formed at its center portion inward in the inserting direction A. The opening 224 is located at a position corresponding to the upper carriage 15U of the carriage assembly 15 and extends in the predetermined radial direction C. The opening 224 is surrounded by a generally U-shaped protruding edge 225 protruding upward from the principal surface 220 of the disk holder 22 along the periphery of the opening 224. On the other hand, the carriage assembly 15 has a pair of lateral arms 153 extending in a lateral direction. The lateral arms 153 are located on or above the protruding edge 225. In the state where the floppy disk is ejected from the disk holder 22, the lateral arms 153 are engaged with the protruding edge 225 to separate the upper and the lower magnetic heads 14 from each other, as will later be described. In addition, the disk holder 22 has an opening 226 formed inward in the inserting direction A at a right-hand side of the opening 224. The opening 226 has such a shape as to allow the rotation of a lever part of the eject lever which will later be described.

On the main frame 13, the eject lever depicted at 24 is rotatably arranged in the vicinity of the carriage assembly 15. Specifically, the main frame 13 is provided with a rod pin 134 standing up and extending upward from the principal surface thereof. The eject lever 24 comprises a cylindrical part 240 receiving the rod pin 134 fitted therein, an arm part (lever part) 241 extending from the cylindrical part 240 in a radial direction, a projecting part 242 formed at a free end of the arm part 241 to extend upward, and the arc-shaped locking part 243 extending from a free-end side of the arm part 241 in a circumferential direction. In the eject lever 24, an eject lever spring 25 is fitted around the cylindrical part 240 to urge the eject lever 24 in the counterclockwise direction (reverse to a direction depicted by an arrow E) in the figure. The projecting part 242 of the eject lever 24 is loosely fitted in the opening 226 of the disk holder 22. The projecting part 242 is engaged with a predetermined position of a shutter in the floppy disk to controllably open and close the shutter. In addition, a screw 26 is inserted into a tip of the rod pin 134 to prevent the eject lever 24 from being released from the rod pin 134.

The main frame 13 is provided with a front panel 27 attached to its front end portion. The front panel 27 has an opening 271 for insertion and ejection of the floppy disk and a door 272 for closing the opening 271. The front panel 27 is provided with an eject button 28 protruding therefrom to be movable backward and forward. The eject button 28 is fitted in a protruding part 214 protruding forward from a front end of the eject plate 21.

Figure 3:
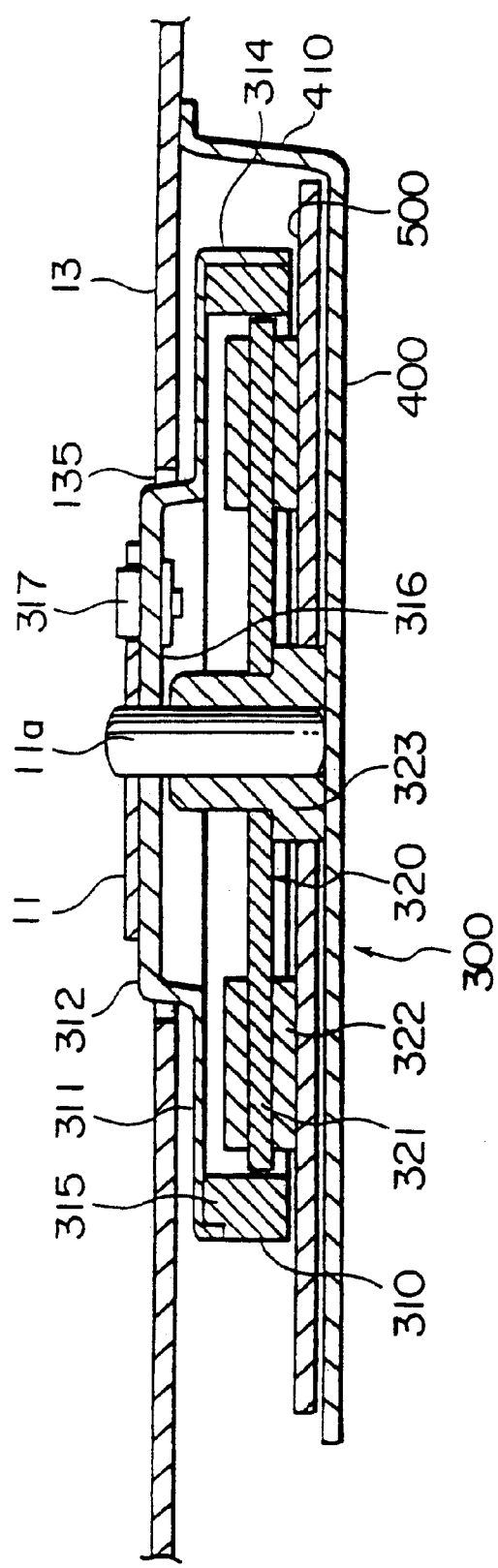
FIG. 3 is a sectional view of a part of the disk drive illustrated in FIG. 1.

Next referring to FIG. 3, description will be made of the spindle motor 300 used in the disk drive mentioned above.

The spindle motor 300 illustrated in the figure comprises a rotor 310 and a stator 320 coupled with the rotor 310. The rotor 310 comprises a disk-shaped metal casing 311 having a trapezoidal-section portion 312 protruding upward from its center area. The trapezoidal-section portion 312 has a generally trapezoidal section. To an upper surface of the trapezoidal-section portion 312, the disk table 11 is fixedly attached. The main frame 13 is provided with a circular opening 135 which allows only an upper part of the trapezoidal-section portion 312 of the rotor 310 to protrude upward from the principal surface of the main frame 13. As a consequence, the disk table 11 protrudes above the principal surface of the main frame 13.

The rotor 310 is coupled with the rotation shaft 11a made of metal and integrally fixed thereto at its center to penetrate through the casing 311 and the disk table 11. Specifically, when the disk table 11 is formed from a plastic magnet by injection molding, the casing 311 and the rotation shaft 11a are integrally coupled to the disk table 11. The casing 311 has a cylindrical body 314 formed at its periphery to extend downward. A ring-shaped permanent magnet 315 is attached to an inner surface of the cylindrical body 314.

The permanent magnet 315 has a main magnetization area extending in a circumferential direction. The permanent magnet 315 has a bottom surface provided with a motor-servo magnetization area extending in the circumferential direction. In case where the stator 320 which will later be described has 15 magnetic poles, the main magnetization area has 20 poles (10 N poles and 10 S poles). On the other hand, the motor-servo magnetization area has 120 poles (60 N poles and 60 S poles) irrespective of the number of the poles of the stator 320. The main magnetization area and the motor-servo magnetization area may be called a drive magnetization area and a detection magnetization area, respectively.

The cylindrical body 314 is partially recessed to form a plurality of recessed portions through which the main magnetization area is partially exposed and protruded to serve as a plurality of magnetic poles.

The trapezoidal-section portion 312 has a lower surface to which an arm 316 is attached. The arm 316 is provided with a drive roller 317 rotatably coupled therewith. The trapezoidal-section portion 312 and the disk table 11 are provided with generally rectangular holes (not shown), respectively. Through these holes, the drive roller 317 protrudes above the disk table 11. The floppy disk loaded in the disk drive is placed on the disk table 11. The drive roller 317 is fitted into a hole formed in a hub (not shown) of the floppy disk to drive and rotate the magnetic disk medium.

On the other hand, the stator 320 is attached to the back surface of the main frame 13 through a motor frame 400 made of metal. Specifically, the stator 320 is formed on a printed circuit board 500 mounted on a principal surface of the motor frame 400. The stator 320 comprises a core assembly including a plurality of stator cores 321 extending in a radial direction, a plurality of stator coils 322 wound around the stator cores 321, respectively, and a center metal (bearing portion) 323 receiving the rotation shaft 11a. The motor frame 400 has a plurality of fixing portions 410 each of which has an inverted L-shape and extends upward from a peripheral edge of the motor frame 400 to be brought into contact with the back surface of the main frame 13.

Figure 4:
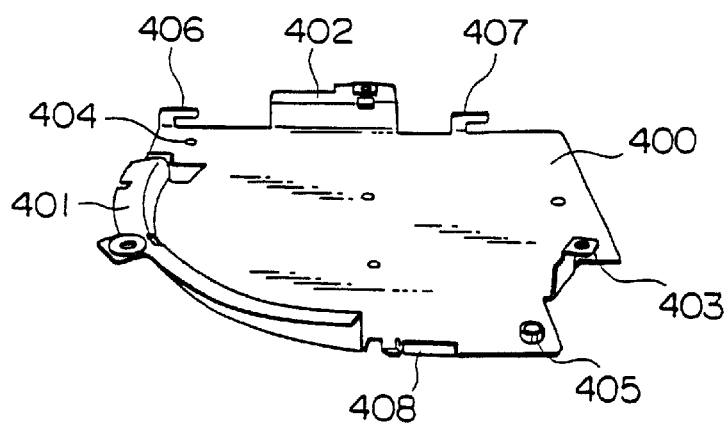
FIG. 4 is a perspective view of a motor frame used in the disk drive illustrated in FIG. 1.
Figure 5:
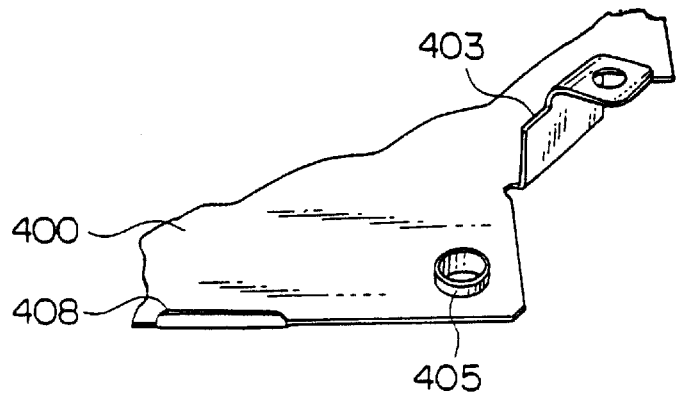
FIG. 5 is an enlarged perspective view of a characteristic part of the motor frame illustrated in FIG. 4.
Figure 6:
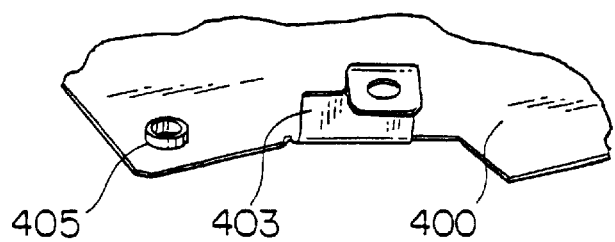
FIG. 6 is an enlarged perspective view of the characteristic part of the motor frame illustrated in FIG. 4 as seen in a different direction.
Figure 7:
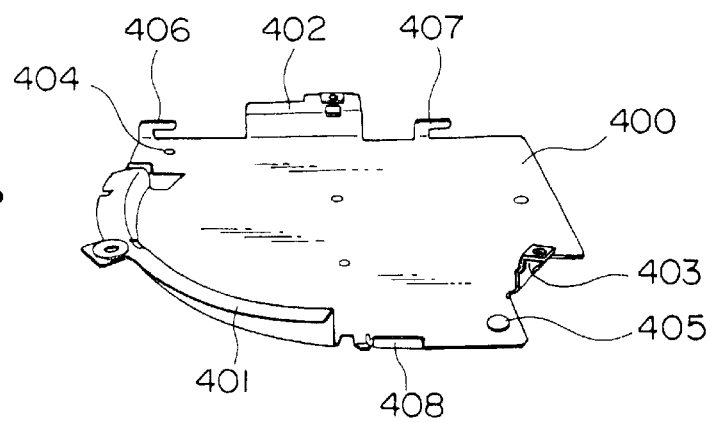
FIG. 7 is a perspective view of a motor frame used in a disk drive according to an embodiment of this invention.
Figure 8:
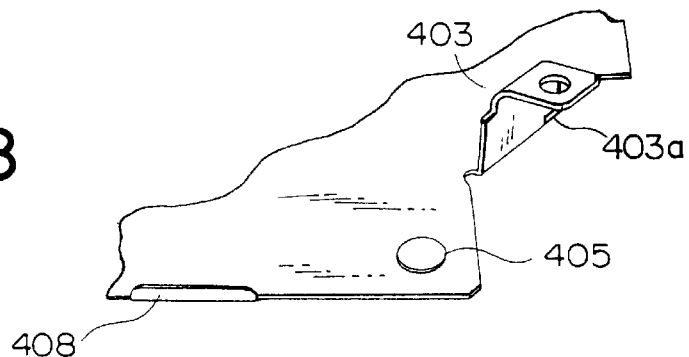
FIG. 8 is an enlarged perspective view of a characteristic part of the motor frame illustrated in FIG. 7.
Figure 9:
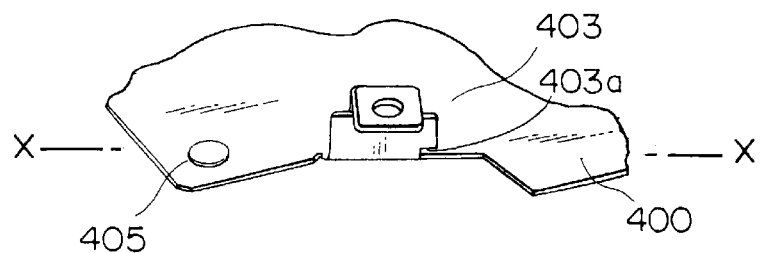
FIG. 9 is an enlarged perspective view of the characteristic part of the motor frame illustrated in FIG. 7 as seen in a different direction.

Additionally referring to FIGS. 4 through 6 showing the motor frame 400 alone in detail, the relationship between the main frame 13, the motor frame 400, and the printed circuit board 500 will be described.

The motor frame 40 has a plurality of projections 401, 402, and 403 preliminarily formed to protrude from the principal or upper surface and is fixed to the lower surface of the main frame 13 by the use of these projections. The motor frame 400 is provided with two positioning bosses 404 and 405 and three board holding portions 406, 407, and 408 all of which protrude upward on the principal surface. On the other hand, the printed circuit board 500 is provided with positioning holes 501 and 502 corresponding to the positioning bosses 404 and 405, respectively. As best shown in FIG. 5, each of the positioning bosses 404 and 405 is formed by burring and therefore has a through hole (the positioning boss 405 alone being illustrated in the figure).

Before the motor frame 400 is fixed to the main frame 13, the printed circuit board 500 is placed on the principal surface of the motor frame 400. At this time, the positioning bosses 404 and 405 are fitted into the positioning holes 501 and 502. Furthermore, the board holding portions 406, 407, and 408 are bent to be engaged with the end portions of the printed circuit board 500.

After the printed circuit board 500 is fixed to the motor frame 400 as mentioned above, the motor frame 400 is fixed to the main frame 13. Next referring to FIGS. 7 through 10 in addition to FIGS. 1 through 3, description will be made of a floppy disk drive according to an embodiment of this invention. The floppy disk drive described herein is generally similar in structure and function to the conventional floppy disk drive illustrated in FIGS. 1 through 3. Therefore, description of the general structure and the general function of the floppy disk drive will be omitted herein. Furthermore, similar parts similar to those in FIGS. 4 through 6 are designated by like reference numerals and will not be described any longer.

A motor frame 400 is provided with a plurality of projections 401, 402, and 403 preliminarily formed to protrude upward on the principal or upper surface thereof. One projection 403 is provided with a slit 403a formed at its base to extend along the principal surface of the motor frame 400. The slit 403a is designed to have a width substantially equal to or slightly greater than the thickness of the printed circuit board 500.

The motor frame 400 is provided with two positioning bosses 404 and 405 protruding upward on the principal surface thereof. One positioning boss 405 near to the projection 403 is formed by coining. Since the positioning boss 405 is formed by the coining, the positioning boss 405 has no through hole and has a smooth surface. The other positioning boss 404 is formed by burring, like in the conventional disk drive.

The motor frame 400 is further provided with three board holding portions 406, 407, and 408, like in the conventional disk drive. The printed circuit board 500 may be equivalent to that of the conventional disk drive with a stator of a motor mounted on its upper surface.

Figure 10:
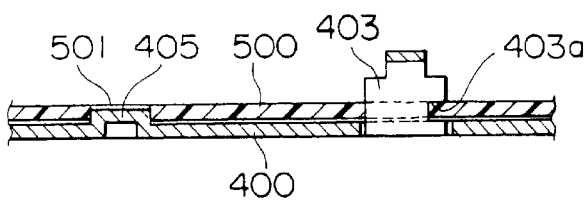
FIG. 10 is a sectional view of the motor frame in FIG. 7 with a printed circuit board fixed thereto, taken along a line X—X in FIG. 9.

Before the motor frame 400 is fixed to the main frame 13, the printed circuit board 500 is placed on the principal surface of the motor frame 400. At first, the positioning boss 404 is fitted to a positioning hole 502 formed in the printed circuit board 500. Next, the printed circuit board 500 is made to slide along the principal surface of the motor frame 400 and a part of the printed circuit board 500 is inserted into the slit 403a to be engaged with the projection 403, as illustrated in FIG. 10. After completion of insertion into the slit 403a, the positioning boss 405 is fitted to the positioning hole 501 correspondingly. Furthermore, the board holding portions 406, 407, and 408 are bent to be engaged with end portions of the printed circuit board 500.

After the printed circuit board 500 is fixed to the motor frame 400 as mentioned above, the motor frame 400 is fixed to the main frame 13.

With the above-mentioned structure, the printed circuit board 500 is engaged not only with the board holding portions 406, 407, and 408 but also with the projection 403. Therefore, the printed circuit board 500 is prevented from floating up and accurately fixed to the motor frame 400 with a high parallelism kept. Since the printed circuit board 500 is inserted into the slit 403a at the base of the projection 403, the contact condition of the printed circuit board 500 to the motor frame 400 can be improved without increasing post-working steps. As described above, the printed circuit board 500 is made to slide along the motor frame 400. At this time, since the positioning boss 405 is formed by the coining and has the smooth surface, such sliding movement is smoothly carried out and does not damage the printed circuit board 500.

In the foregoing, the slit 403a is formed at the base of the projection 403. This may be understood that the projection 403 is provided with a tongue integrally formed at its edge to extend in parallel to the principal surface of the motor frame 400.

What is claimed is:

1. A disk drive comprising:

a motor frame having a principal surface; and a printed circuit board placed on said principal surface and having a positioning hole;

said motor frame having:

a projection protruding from said principal surface and having a slit formed on its side surface;

a plurality of board holding portions protruding from said principal surface and engaged with end portions of said printed circuit board; and a positioning boss formed by coining and protruding from said principal surface to be fitted into said positioning hole;

wherein said positioning boss has no through hole and has a smooth surface; and wherein said printed circuit board is inserted into said slit to be engaged with said projection.

2. A disk drive as claimed in claim 1, wherein said slit is adjacent to said principal surface of said motor frame.

3. A disk drive as claimed in claim 1, further comprising:

a main frame which faces the principal surface of said motor frame with a space kept therefrom, said motor frame being fixed to said main frame; and a motor mounted on said motor frame.

4. A disk drive as claimed in claim 3, wherein said motor has a stator arranged in said space and fixed to said printed circuit board.

5. A disk drive as claimed in claim 3, wherein said projection is fixed to said main frame.

* * * * *